UNITED STATES PATENT OFFICE.

L. R. STREETER, OF CHELSEA, ASSIGNOR TO HIMSELF AND A. B. ELY, OF NEWTON, MASSACHUSETTS, TRUSTEES.

IMPROVED DENTAL PLATE.

Specification forming part of Letters Patent No. 89,253, dated April 20, 1869.

*To all whom it may concern:*

Be it known that I, LEANDER R. STREETER, of Chelsea, in the State of Massachusetts, have invented certain new and useful Improvements in the Manufacture of Dental Plates for Artificial Teeth and Gums, &c., of which the following, with the references, is a full description:

My invention consists in applying to the manufacture of dental plates and gums pyroxyline or soluble gun-cotton reduced, or made into a soft, plastic, or pulpy state by a solvent, and brought into the required shape by pressure in molds, and hardened by evaporation, &c.; and the dental plates so made.

The idea was first conceived by me years ago, and I commenced a series of experiments, with varied success, to that end.

Having discovered that pyroxyline and its compounds could be used for that purpose, I found it required no inconsiderable amount of invention to work out the idea.

I am aware of the English patent of Parkes, and that of Barnwell & Rollason, and the American patent of Pierson, regarding the use of pyroxyline; but neither of them contemplated my invention, and I believe I was the first to attempt invention in that direction. The subject was surrounded with many difficulties, inconceivable in the outset; and, although I may be indebted to Parkes, more particularly, for some suggestions, they availed little, and it was only after long and tedious experimentation and invention that I was enabled to produce really satisfactory results. The ordinary manipulations of plastic pyroxyline, as contemplated and described by them, and for the purposes by them conceived, were not difficult; but when the prevention of shrinkage, the nice fitting and adhesion of the parts, and the requisite qualities so necessary in preparing dental plates, and so necessary to the plates when prepared, came to be considered, the whole subject assumed a new aspect, and demanded great care and continued trials, and no little invention, to secure a practical end.

The pyroxyline should be thoroughly softened, or dissolved in some of the well-known solvents, singly or in compound, so as to be made semi-fluid, or pasty, or plastic, and easy to be worked. It may be so soft as to be poured into the molds; but I have preferred to use it in a more nearly solid state. In many, and perhaps most cases, it may be found more satisfactory to compound or combine it with other substances with which it will harmonize, in order to reduce the tendency to shrinkage, and also, in some cases, to change its rigidity when dried, and to add body, &c.; but I have made plates of the pure pyroxyline, with only color added, and have prepared it for packing, so as to roll and lap and reroll it, as I would putty or dough. Any suitable coloring substance may be used.

The articles that may be compounded or combined with pyroxyline are manifold, as rubber, gutta-percha, waxes, oils, shell, horn, amber, resinous, fibrous, textile, and filamentary substances, minerals, and metals, in fine division, and singly or in compound; but I do not confine myself to any particular combinations, so long as good results are attained. I have used pyroxyline, wax, and zinc-white, in the proportion of about twenty-four of one to five and three of the others, with good effect; but I do not confine myself to this formula. In using some materials, care should be taken not to take so large a proportion as to deprive the compound of its proper toughness, and to render it brittle, or frangible, as may be the case (with too little pyroxyline) if comminuted and made distinctively massive or earthenwarish. Usually the pyroxyline should largely predominate.

After the material (alone or in compound) is made or reduced to a paste, or pulp, or dough, it is to be forced or packed into molds, in layers or otherwise, and brought under pressure, and the solvents evaporated. For many purposes, preferably, it may be prepared and rolled or pressed out into sheets, and so used, or the sheets may be left to harden, and then, when to be used, they, or so much as may be required, may be moistened and softened by being heated with the solvents until sufficiently plastic or pliant, and so that the surfaces shall be adhesive when in contact, and then packed in molds, very much in the manner in which vulcanized rubber is packed, and in similar molds; or it may be shredded, or disintegrated, and softened with solvents till sufficiently plastic, and then packed in molds. In packing it should be well forced or pressed up to the teeth, and, if need be, kept moist and adhesive in that locality as long as practicable, that it may be well attached to the pins or other devices for fastening on the teeth. Cloth moistened with the solvents may often be interposed with advantage when packed in opening molds.

Evaporation, &c., may be advantageously advanced by using heat, which ordinarily need not exceed that of boiling water, and which may be applied by putting the flask in a dry vessel in the heated water. Ordinary pressure and a few hours' time will suffice in most cases. The general manipulations in the mold, and the finishing up of the plate, are similar to those of vulcanized rubber.

The basic material may be called soluble gun-cotton, or pyroxyle, or pyroxyline, or xyloidine, it being vegetable fiber treated with nitric or nitric and sulphuric acids, or equivalents, and afterward dissolved or treated and made fluid or semi-fluid, or soft and pasty, or plastic and pliant, with suitable solvents, singly or compounded. I have been using compound solvents successfully. The basic process is forcing or packing the material, pure or mixed, when made soft and plastic and adhesive, into molds, and bringing it into proper shape and adhesion by pressure, and to proper hardness by evaporation, &c., with or without heat, as may be desirable. Other ingredients and substances may be compounded or mixed with the basic material; but the manipulation will be the same. I have found the ordinary flasks and plaster molds used for vulcanite in ordinary cases to answer my purpose, used in the ordinary way.

In my claims, by the word "material," I intend the basic material above mentioned, and by the word "materials," the same, compounded or combined with one or more other substances, as described; and the material or materials should be so prepared and heated as to insure the proper toughness, hardness, elasticity, durability, and strength in the finished plate.

Where tortoise-shell, horn, or any hard and ordinarily insoluble body, the strength and solidity of which arise from a mucous or a gelatinous element, is added to the pyroxyle to give it body and rigidity, or strength, it may generally be used in the proportion of two-fifths of the same to three-fifths of the pyroxyle; but if more than one-sixth of the whole mass be composed of zinc-oxide, or other white pigment or body, then some less of the hard body should be used, retaining essentially the full proportion of pyroxyle. A much less proportion of the pyroxyle would make a very firm and hard base; but its chemical power to resist reagents, &c., in the mouth might not be as reliable. Where increased body is obtained by the use of bone or shell, it will be found better not to reduce it to a very fine powder, as it would not so readily unite by interlocking or semi-felting under the manipulations and molding.

What I claim is—

1. The manufacture of dental plates and gums from the material or materials substantially as described.

2. Dental plates and gums manufactured of the material or materials substantially as described, or in the manufacture of which said material forms an essential ingredient, substantially as set forth.

3. The attachment or combination of artificial teeth to or with artificial bases, plates, or gums, made in whole or in part of the material substantially as described.

4. The method of preparing, manipulating, and hardening the plate from the material or materials, and in the manner substantially as specified.

In testimony whereof I have hereunto subscribed my name.

L. R. STREETER.

Witnesses:
J. W. PRESTON,
M. E. NYALLS.